(No Model.) 2 Sheets—Sheet 1.
T. TOLSON.
BICYCLE FRAME.
No. 591,306. Patented Oct. 5, 1897.
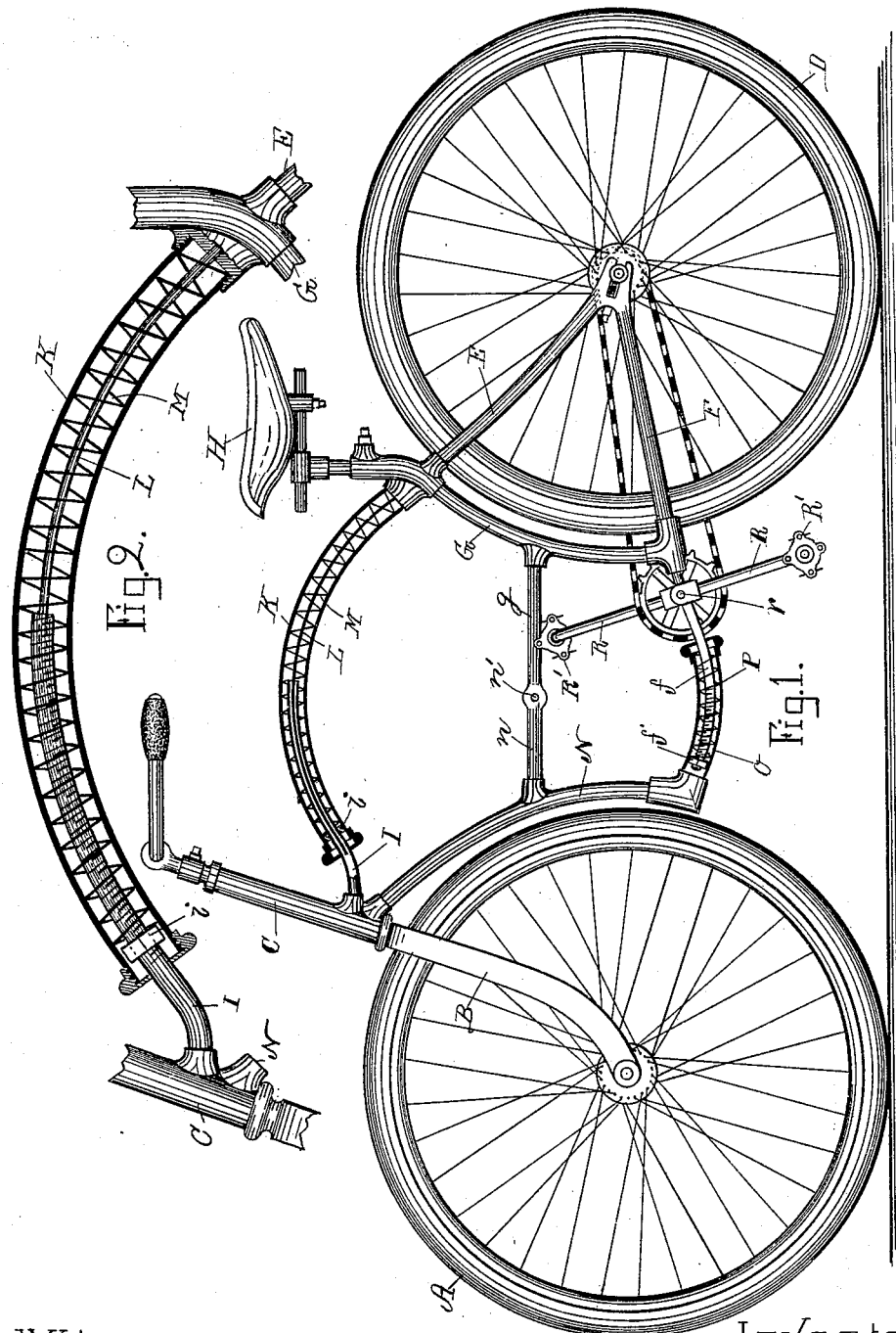
Witnesses.
Laurits N. Møller
Charles A Harris
Inventor.
Thomas Tolson,
by Van Andren
his atty.

(No Model.) 2 Sheets—Sheet 2.

T. TOLSON.
BICYCLE FRAME.

No. 591,306. Patented Oct. 5, 1897.

Witnesses.
Lauritz N. Möller
Charles A. Harris

Inventor
Thomas Tolson
by Urban Andrén his atty.

UNITED STATES PATENT OFFICE.

THOMAS TOLSON, OF BOSTON, MASSACHUSETTS.

BICYCLE-FRAME.

SPECIFICATION forming part of Letters Patent No. 591,306, dated October 5, 1897.

Application filed November 30, 1896. Serial No. 613,862. (No model.)

*To all whom it may concern:*

Be it known that I, THOMAS TOLSON, a citizen of Great Britain, and a resident of Boston, in the county of Suffolk and State of Massachusetts, have invented new and useful Improvements in Bicycle-Frames, of which the following, taken in connection with the accompanying drawings, is a specification.

This invention relates to improvements in bicycle-frames; and it has for its object to render the frame yielding and elastic for the purpose of preventing the bicycle from being jarred or unnecessarily shaken when riding over uneven roads or streets, thus insuring an easy and comfortable riding and propulsion of the bicycle, as will hereinafter be more fully shown and described, reference being had to the accompanying drawings, wherein—

Figure 3:
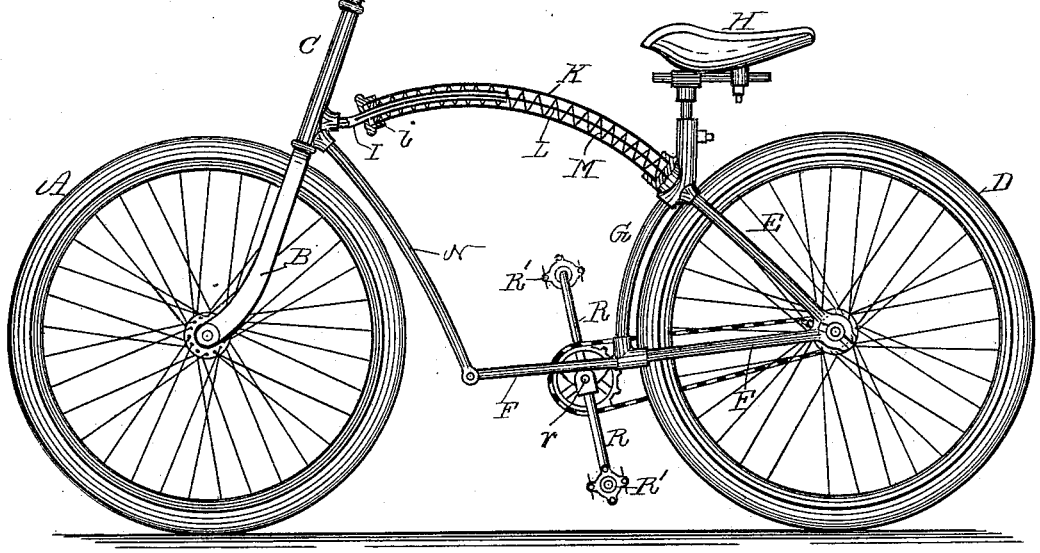
Figure 4:
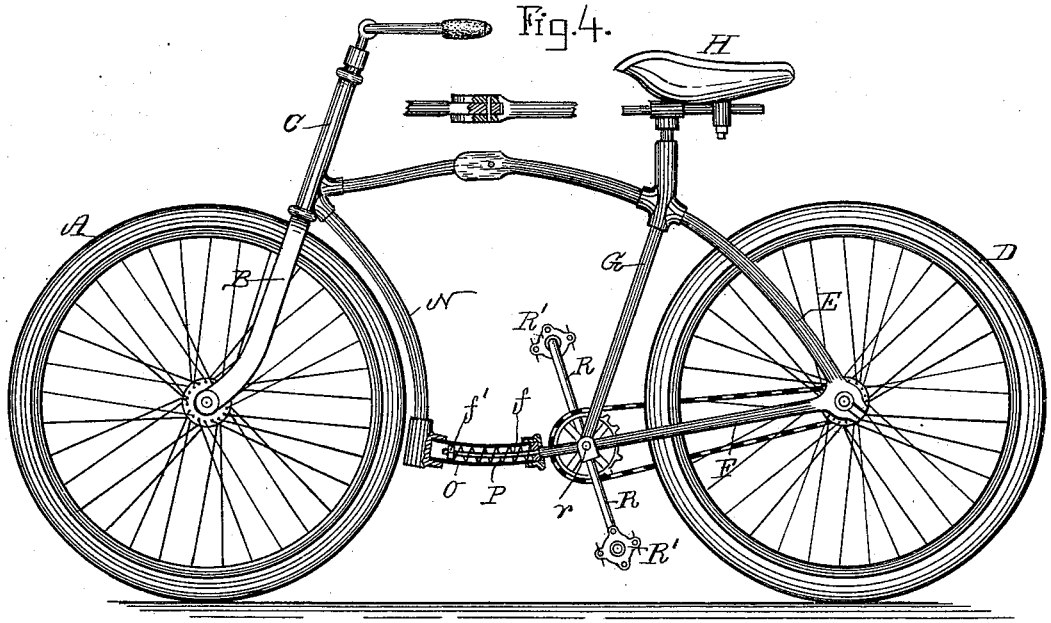

Figure 1 represents a side elevation of my invention, partly shown in section. Fig. 2 represents a detail sectional view of the upper yielding brace. Figs. 3 and 4 represent modifications of the invention.

Similar letters represent similar parts wherever they occur on the different parts of the drawings.

In the drawings, A represents the front wheel, as usual, journaled in the fork B, the shank of which is journaled in the socket C, that forms a part of the frame, as is common in velocipedes or bicycles.

D is the rear driving-wheel, journaled in the rear portion of the frame parts E and F, as usual in devices of this kind.

G is the saddle-post, secured to the parts E F, as shown.

H represents the saddle as usual.

To the socket C is secured a curved tube I, fitting loosely within a correspondingly-curved tube K, secured at its rear end to the frame portions G E, as shown in Figs. 1, 2, and 3. To the frame portions G E is also secured a curved rod or pipe L, the free end of which is guided in the curved tube I, as shown in said Figs. 1, 2, and 3.

On the tube I is secured an adjustable nut *i*, between which and the saddle-post G is located, within the curved tube K, a compressible spring M, as shown in Figs. 1, 2, and 3.

N is a frame portion extending downwardly from the socket C, and has attached to its lower end a curved tube O, adapted to receive a curved rod or pipe *f*, which forms a forward extension of the frame portion F, as shown in Figs. 1 and 4. The forward end of the curved rod *f* is provided with an adjustable nut *f'*, between which and the rear end of the curved tube O is arranged, within the latter, a compressible spiral spring P, as shown in said Figs. 1 and 4.

*n* and *g* are arms secured, respectively, to the front and rear frame portions N G and having their inner ends pivoted together at *n'*, as shown in Fig. 1.

*r* is the pedal-shaft, journaled in the lower part of the frame and provided with cranks R and pedals R', as is usual in velocipedes.

From the above it will be seen that the weight of the rider is more or less supported on the compressible springs M P, thus serving as an elastic and yielding support to prevent the rider from being unpleasantly jarred and shaken, particularly when riding on uneven or rutty roads or pavements. By means of the nuts *i* and *f'* the tension of the respective springs M P may be adjusted to suit requirements according to the weight of the rider or the condition of the roads.

As a modification of the invention I have represented one feature in Fig. 3, in which the lower spring on the frame is dispensed with and the frame portion N pivoted at its lower end to the forward extension of the frame portion F.

In Fig. 4 I have shown another modification, in which the upper spring is dispensed with and the upper frame portions pivoted together in a suitable manner, by which the same advantageous results are obtained.

From the above it will readily be understood that the frame is elastically cushioned in such a manner as to prevent shocks and jars being given to the rider no matter how uneven the road-bed may be, thus insuring ease and comfort to the rider under all circumstances.

I do not wish to confine myself to the exact construction as shown, as equivalent devices may be used without departing from the essence of my invention.

What I wish to secure by Letters Patent and claim is—

1. In a velocipede-frame, the combination with the front and rear members thereof, of an arched tube projecting outward from one member and extending to near the opposite member, a coiled spring arranged in said tube, a second arched tube projecting from said opposite member into the first-named tube and arranged to have a compressing action upon the spring, and a pivotal connection between other portions of the frame members, such pivot being the center of the curvature of the arched tubes, substantially as described.

2. In a velocipede-frame, the combination with the front and rear members thereof, of an arched tube projecting outward from one member to near the opposite member, a coiled compression-spring arranged within said tube, a second arched tube projecting from said opposite member into the first-named tube, an adjustable nut on the said second-named tube, said nut being arranged to have a compressing action upon the spring, and arms projecting outward from other portions of the frame members and pivoted together at their ends, such pivot being the center of the curvature of the arched tubes, substantially as described.

3. In a velocipede-frame, the combination with the front and rear members thereof, of an oppositely-curved tube projecting outward from the upper and lower portions of said members, a coiled spring arranged within each tube, similarly-curved tubes projecting outward from the opposite frame members and entering the first-named tubes and arranged to have a compressing action upon the springs, and an arm projecting outward from each frame member intermediate the arched tubes, and having a pivotal connection at their ends, substantially as described.

In testimony whereof I have signed my name to this specification, in the presence of two subscribing witnesses, on this 21st day of November, A. D. 1896.

THOMAS TOLSON.

Witnesses:
ALBAN ANDRÉN,
LAURITZ N. MÖLLER.